United States Patent
Haartsen (12) 
(10) Patent No.: US 6,519,460 B1
(45) Date of Patent: Feb. 11, 2003

(54) RESOURCE MANAGEMENT IN UNCOORDINATED FREQUENCY HOPPING SYSTEM

(75) Inventor: Jacobus Cornelis Haartsen, Hardenberg (NL)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/385,024

(22) Filed: Aug. 30, 1999

Related U.S. Application Data (60) Provisional application No. 60/133,404, filed on May 10, 1999.

(51) Int. Cl.$^7$ .............................................. H04L 27/30
(52) U.S. Cl. ......................... 455/452; 455/41; 370/330; 375/131
(58) Field of Search ................... 455/41, 452; 370/330, 370/480, 349; 375/131, 132, 133

(56) References Cited

U.S. PATENT DOCUMENTS

| | | | |
|---|---|---|---|
| 4,780,885 A | 10/1988 | Paul et al. | |
| 5,428,637 A | 6/1995 | Oliva, Jr. et al. | |
| 5,483,550 A | 1/1996 | Hulbert | |
| 5,519,717 A | 5/1996 | Lorenzo et al. | |
| 5,564,097 A | 10/1996 | Swanke | |
| 5,619,493 A | 4/1997 | Ritz et al. | |
| 5,638,399 A | 6/1997 | Schuchman et al. | |
| 5,774,461 A * | 6/1998 | Hyden et al. ............. | 370/310.2 |
| 5,774,808 A | 6/1998 | Sarkioja et al. | |
| 5,781,536 A | 7/1998 | Ahmadi et al. | |
| 5,844,894 A | 12/1998 | Dent | |
| 5,862,171 A | 1/1999 | Mahany | |
| 5,926,501 A | 7/1999 | Souissi et al. | |
| 6,292,508 B1 * | 9/2001 | Hong et al. .................. | 375/134 |
| 6,400,751 B1 * | 6/2002 | Rodgers ...................... | 375/132 |

OTHER PUBLICATIONS

Haartsen J., "Bluetooth—the Universal Radio Interface for ad hoc, Wireless Connectivity", Ericsson Review, SE, Ericsson, No. 3, Jan. 1, 1998, pp 110–117.

Karol M. J., et al., "Time–Freqnecy–Code Slicing: Efficiently Allocating the Communications Spectrum to Multirate Users", IEEE Transactions on Vehicular Technology, US, IEEE Inc. New York, vo. 46, No. 4, Nov. 1, 1997, pp. 818–826.

\* cited by examiner

*Primary Examiner*—Thanh Cong Le
*Assistant Examiner*—Nick Corsaro
(74) *Attorney, Agent, or Firm*—Burns, Doane, Swecker & Mathis, L.L.P.

(57) ABSTRACT

A method and apparatus are described for applying a narrow band FH link for low-rate and medium-rate communications, and a stationary wide band channel for high-speed (HS) communications. A master and one or more slaves sharing the same FH link may form a piconet. Master and slaves may hop synchronously according to a pseudo-random hop sequence. A master may control traffic on the FH link. An HS link can be established between a master and one or more slaves or between two slaves. An appropriate band of the radio spectrum is selected adaptively based on lowest RSSI measurements both in master and slave to establish the HS link without making use of a hopping scheme. A master shares its time between the HS slave on the HS link and the slaves remaining on the FH link using Time Division multiplexing. If the HS link uses a part of the band over which the piconet hops, the master controls the traffic such that the HS link is never visited by the FH link. If the HS link and the FH link do not overlap, then hop avoidance is not required. The HS slave-pair remains in contact with the master by a beacon signal used on the FH link. Periodically, HS slaves interrupt HS communications to listen the FH link. The beacon protocol includes slaves returning from the HS link to the piconet channel. In an alternative embodiment, slaves communication over HS link for a time interval. Slaves automatically return to FH link after the expiration of the time interval.

4 Claims, 11 Drawing Sheets

RESOURCE MANAGEMENT IN UNCOORDINATED FREQUENCY HOPPING SYSTEM

This application claims priority under 35 U.S.C. §§119 and/or 365 to Provisional Patent Application No. 60/133,404 filed in U.S. Patent and Trademark Office on May 10, 1999; the entire content of which is hereby incorporated by reference.

BACKGROUND

The present invention relates to radio communication systems. In particular, the present invention is related to communication systems which use frequency hopping in unlicensed frequency carriers.

In the last decades, progress in radio and VLSI technology has fostered widespread use of radio communications in consumer applications, portable devices, such as mobile radios, can now be produced having acceptable cost, size and power consumption.

Although wireless technology is today focused mainly on voice communications (e.g. with respect to handheld radios), this field will likely expand in the near future to provide greater information flow to and from other types of nomadic devices and fixed devices. More specifically, it is likely that further advances in technology will provide very inexpensive radio equipment which can be easily integrated into many devices. This will reduce the number of cables currently used. For instance, radio communication can eliminate or reduce the number of cables used to connect master devices with their respective peripherals.

The aforementioned radio communications will require an unlicensed band with sufficient capacity to allow for high data rate transmissions. A suitable band is the ISM (Industrial, Scientific and Medical) band at 2.4 GHz, which is globally available. The ISM band provides about 83.5 MHZ of radio spectrum.

To allow different radio networks to share the same radio medium without coordination, signal spreading is usually applied. In fact, the FCC in the United States currently requires radio equipment operating in the 2.4 GHz band to apply some form of spreading when the transmit power exceeds about 0 dBm. Spreading can either be at the symbol level by applying direct-sequence (DS) spread spectrum or at the channel level by applying frequency hopping (FH) spread spectrum. The latter is attractive for the radio applications mentioned above since it more readily allows the use of cost-effective radios. A system called Bluetooth was recently introduced to provide pervasive connectivity especially between portable devices like mobile phones, laptops, PDAs, and other nomadic devices. This system applies FH to enable the construction of low-power, low-cost radios with a small footprint. The system supports both data and voice, the latter being optimized by applying fast FH with a nominal rate of 800 hops/s through the entire ISM band in combination with a robust voice coding. The system concept includes piconets consisting of a master and a limited number of slaves sharing the same 1 MHZ channel. The system also features low-power modes like HOLD and PARK where the slaves can be put in a temporary suspend or low duty cycle tracking mode, respectively. For additional information regarding the Bluetooth system, see "Bluetooth, the Universal Radio Interface for Ad Hoc wireless connectivity", J. C. Haartsen, Ericsson Review, Telecommunications Technology Journal, No. 3, 1998.

In an FH system deploying transmit power above 0 dBm, the channel bandwidth may be limited to 1 MHZ. Limiting bandwidth correspondingly restricts data rates to the 1–2 Mb/s range. However, especially for data services like file transfer or file download, ever-increasing data rates are desirable. In a FH system with a limited hop bandwidth (e.g. 1 MHZ), high data rates are difficult to obtain. In a DS system, high data rates are also difficult to obtain at reasonable costs. DS systems have the additional disadvantage of the near-far problem which becomes more serious in uncoordinated scenarios for which the Bluetooth system was optimized. In scenarios where a Bluetooth system is used, communications over short distances (e.g. cable replacement applications) is common practice. In these applications, a data rate in excess of 2 Mb/s would be highly desirable. Yet, by its nature, the system must operate in unlicensed bands where interference cannot be controlled.

It would therefore be appreciated that a need exists in the art for a method and apparatus for providing low-rate, medium-rate, and high-rate data communications concurrently between communications entities over the same unlicensed frequency carrier.

SUMMARY

It is therefore an object of the present invention to provide a communications system for conducting low, medium and high rate communications over a shared communications channel.

It is a further object of the present invention to provide such a communications system having a narrow and wide band communication link over the same shared communication channel.

In accordance with one aspect of the present invention, the foregoing and other objects are achieved in a method and apparatus which applies a narrow band FH link for low-rate and medium-rate communications, and a stationary wide band link for high-speed (HS) communications. The system, generally, may include a master and one or more slaves which all share the same FH link. The master and slaves may form a piconet. Master and slaves may hop synchronously according to a pseudo-random hop sequence. The sequence may be determined by the master identity, the phase in the sequence may be determined by the master real-time system clock. The master may control the traffic on the link. An HS link can be established between the master and one or more slaves or between two slaves.

The high-speed link need not make use of a hopping scheme, and instead an appropriate band of the radio spectrum may be selected to establish the HS link. The selection is based on RSSI measurements both in master and slave, preferably carried out during the low-rate communications in the piconet. The HS link may be placed on the radio band carrying, on average, the lowest amount of interference. The selection is adaptive in the sense that the system avoids using a radio band with much interference for the HS link. If the master is involved in communications with one or more slaves over an HS link, the master has to share its time between the HS slave on the HS link and the slaves remaining on the FH link. Time division multiplexing may be applied where the master, during a certain time interval, resides on an HS link and during the remaining time resides on the FH link. If the master is not involved in communications over an HS link, e.g. two slaves establish an HS link, then piconet communications over an FH link may progress in parallel with the HS link. If the portion of the shared radio band which the HS link uses, is part of the band over which the piconet hops, the master may control traffic such that the HS link is never visited by the FH link. If the HS link and the FH link do not overlap, then such hop avoidance is not required.

The HS slave-pair may further remain in contact with the master by a beacon signal which may be used on the FH link. Periodically, HS slaves may interrupt their HS communications and temporarily listen to the master on the FH link. This beacon also provides a means for the slaves to return from the HS link to the FH link. In an alternative embodiment, the two slaves are directed to the HS link for a limited amount of time. After the time interval has expired, slaves engaged in communications over the HS link may automatically return to the FH link. If required, slaves may be sent to the HS link again. If the HS link experiences interference, the units participating in the HS link return to the FH link and a new HS link can be negotiated. New RSSI measurements will show where the HS link can best be placed.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters. A preferred embodiment of the system described herein utilizes a FH radio interface as described in greater detail in U.S. patent application Ser. No. 08/685,069 "SHORT-RANGE RADIO COMMUNICATIONS SYSTEM AND METHOD OF USE", by P. W. Dent and J. C. Haartsen, filed Jul. 23, 1996, (hereinafter "Dent") the disclosure of which is incorporated herein by reference.

In Dent, an air interface is described based on the transmission of short packets on a FH link. The air interface therein described, forms the basis for a new air interface referred to as Bluetooth, which is intended to provide unlimited radio connectivity between devices of any kind, see "Bluetooth, the Universal Radio Interface for Ad Hoc wireless connectivity", J. C. Haartsen, Ericsson Review, Telecommunications Technology Journal, No. 3, 1998. The Bluetooth concept includes a piconet which is created on a FH link. One of the units on the channel acts as a master and other units are slaves. Any unit can take on the master role or the slave role. The role of master and slave may be assigned when the piconet is established. By default, the unit that initiates the communications, e.g. creates the piconet, is the master. The master controls all traffic over the FH link in a manner using centralized control. A more thorough description of the use of master and slave units in an FH communication system using centralized control may be found in U.S. patent application Ser. No. 08/932,911 by J. C. Haartsen, entitled "FREQUENCY HOPPING PICONETS IN AN UNCOORDINATED MULTI-USER SYSTEM", filed Sep. 18, 1997 and incorporated herein by reference.

Figure 1:
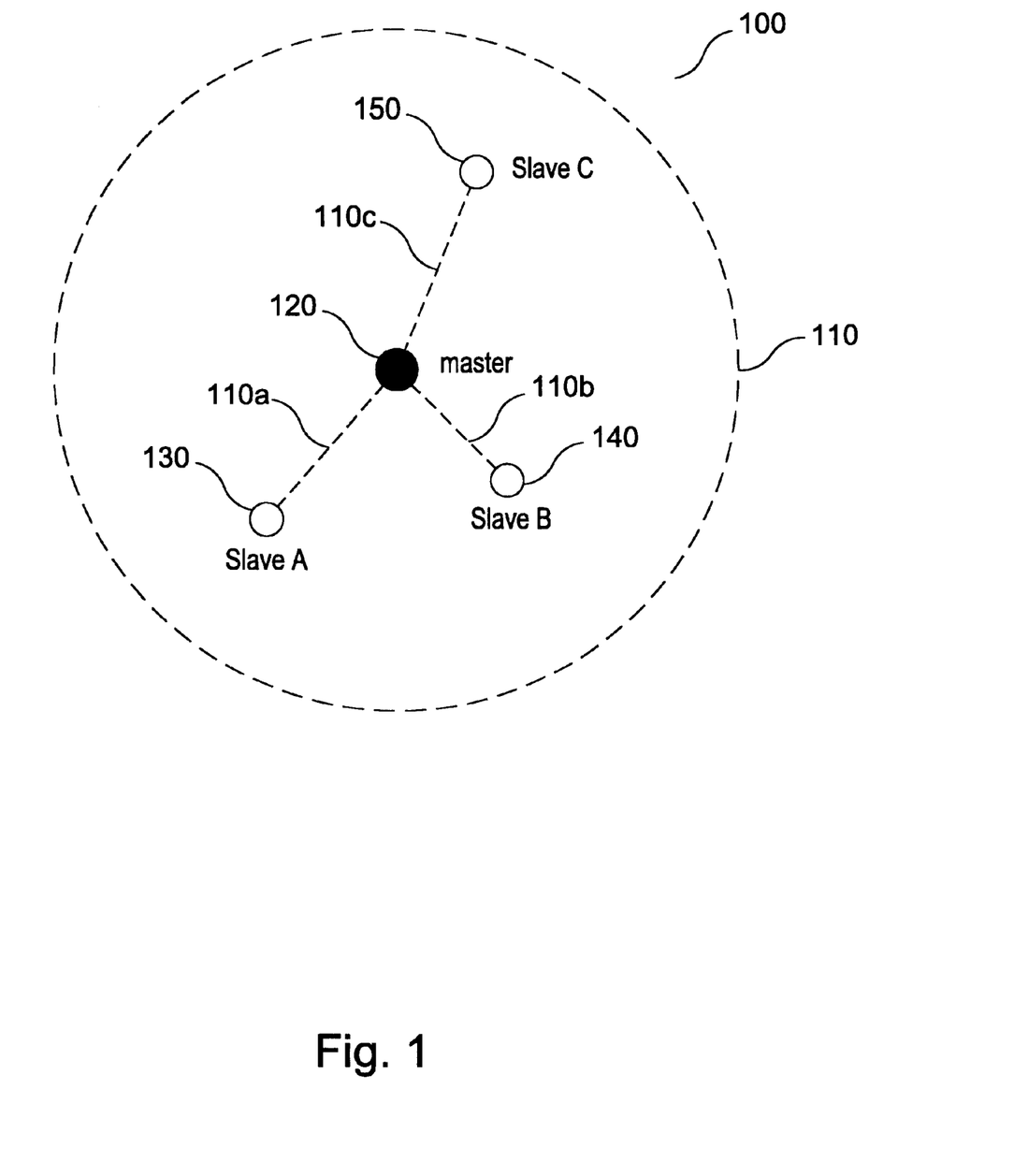
FIG. 1 is a diagram illustrating an exemplary piconet having a master and one or more slaves in accordance with an exemplary Bluetooth system.
Figure 2:
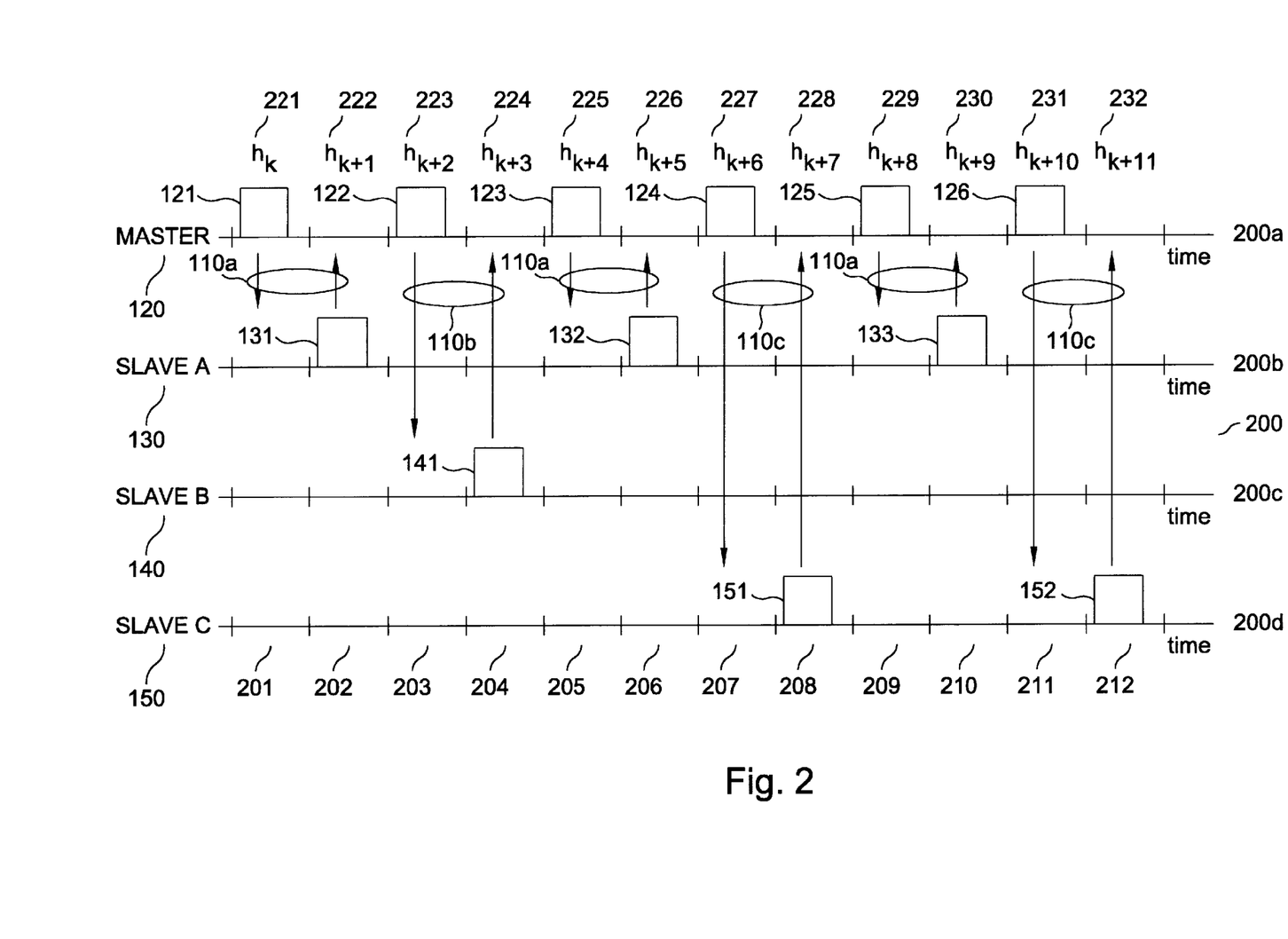
FIG. 2 is a diagram illustrating exemplary timing in an exemplary piconet channel having a master and one or more slaves in accordance with an exemplary Bluetooth system.

In piconet 100, a star configuration may be used as is illustrated in FIG. 1. Master 120 is the center of the star: all communications flow via master 120. When a slave, such as, for example, slave A 130, slave B 140, and slave C 150 joins piconet 100, a slave address may be assigned. The slave address assignment may be temporary since slave units may enter and exit piconet 100. Slave addresses may be included in packets exchanged between, for example, slave A 130, slave B 140, and slave C 150 and master 120. In accordance with U.S. patent application Ser. No. 08/685,069 mentioned above, piconet 100 may generally include FH link 200 using a series of time slots: each slot being assigned a different frequency as is illustrated in FIG. 2. Accordingly, on exemplary FH link 200, master 120 may alternate transmit and receive single packets 121–126 and, for example, packets 131–333 associated with slave A 130, packet 141 associated with slave B 140, and packets 151 and 152 associated with slave C 150 across time slots 201–212, each having a hop frequency 221–232. Frequencies on exemplary FH link 200 may be assigned according to a pseudo-random hopping sequence as would be known to one skilled in the art. Alternate communications between master 120 and, for example, slave A 130, slave B 140, and slave C 150 may be conducted over corresponding links, preferably Time Division duplex links represented in FIG. 2 as channel 110a, channel 110b, and channel 110c, respectively. It may accordingly be preferable for master 120 to communicate with slave A 130, slave B 140, and slave C 150 using, for example, a polling scheme to avoid two slaves transmitting simultaneously. Only that slave which is addressed in a master-to-slave slot corresponding to, for example, a TDD link, may respond in the following slave-to-master slot. Polling may be better understood with reference to channel 110a, channel 110b, and channel 110c, for establishing communications between master 120 and slave A 130, slave B 140, and slave C 150 as is illustrated. Master 120 may, over channel 110a, send packets 121, 123, and 125 in respective master-to-slave time slots 201, 205, and 209 at respective frequencies $h_K$ 221, $h_{K+4}$ 225, $h_{K+8}$ 229 to slave A 130. In response, slave A 130 may respond respectively with packets 131, 132, and 133 only in the respective alternate slave-to-master time slots 202, 206, and 210 at respective frequencies $h_{K+1}$ 222, $h_{K+5}$ 226, $h_{K+9}$ 230. Similarly, master 120 may, over channel 110b, send packet 122 in master-to-slave time slot 203 at frequency $h_{K+2}$ 223 to slave B 140. In response, slave B 140 may respond with packet 141 only in the alternate slave-to-master time slot 204 at frequency $h_{K+3}$ 224. Master 120 may further, over channel 110c, send packets 124 and 126 in respective master-to-slave time slots 207 and 211 at respective frequencies $h_{K+6}$ 227 and $h_{K+10}$ 231 to slave B 140. In response, slave C 150 may respond respectively with packet 151 and 152 only in the respective alternate slave-to-master time slots 208 and 212 at respective frequencies $h_{K+7}$ 228 and $h_{K+11}$ 232.

Figure 3:
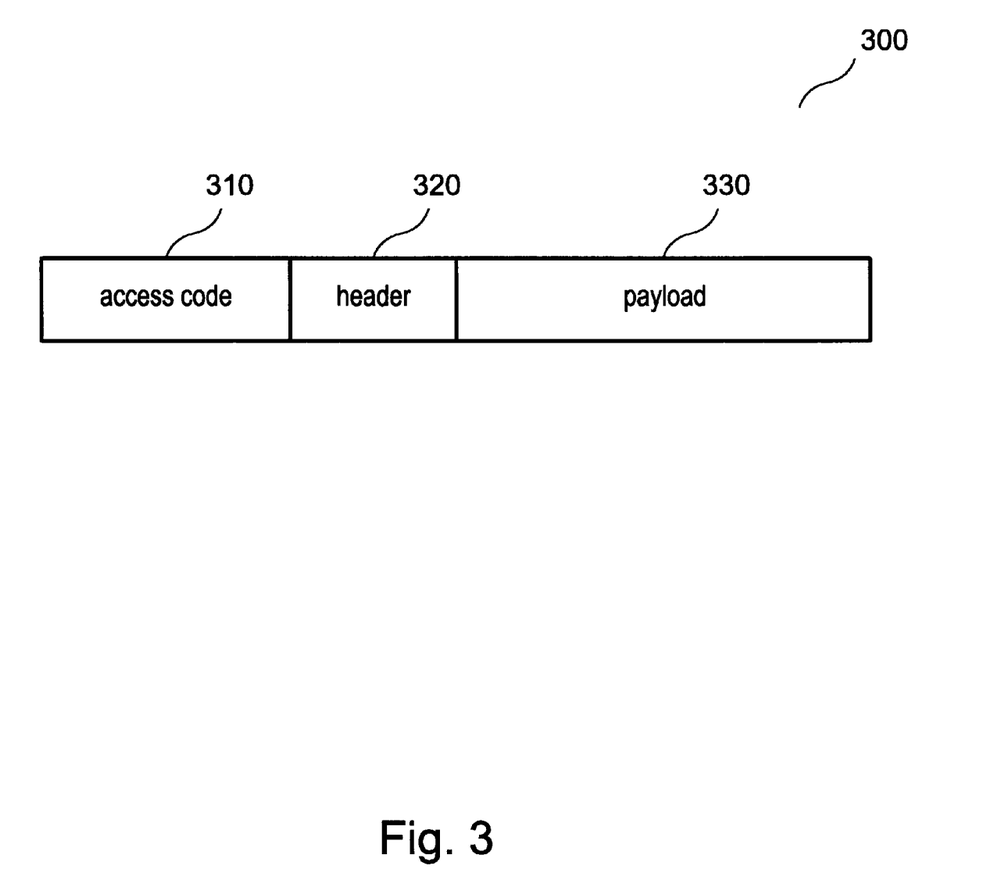
FIG. 3 is a diagram illustrating an exemplary packet format in accordance with an exemplary Bluetooth system.

Packets exchanged within piconet 100 may conform generally to exemplary packet format 300 as illustrated in FIG. 3. Each packet sent according to packet format 300 may include access code 310, header 320, and payload 330 as shown. Access code 310 may be used to identify, for example, a particular FH link. Each separate instance of piconet 100 may use a different access code 310. Access code 310 may be derived, for example, from the identity of master 120. It is to be noted that all packets on, for example, the same FH link may carry the same access code 310. Access code 310 may further be used for frequency and timing recovery in addition identifying the particularly FH link. Packet header 320 may carry general control information, for example, identifying payload 330 and indicating error correction mechanisms. It is to be noted that payload 330 may, for example, be identified as contain data or voice information. It is important to note that in accordance with the present invention, a high speed link may be established in addition to a more conventional FH link on piconet 100. It may be desirable in the context of the high speed link to use a modified packet format 300 to improve overall data transfer figures. Since it is in accordance with the present invention to support both FH and high speed links, packet format 300 may be optimized to suit each link type.

To better understand the desirability associated with providing the high speed link in accordance with the present invention, it may be useful to analyze exemplary bandwidth constraints associated with piconet 100. In a typical Bluetooth system, an exemplary hop rate is 1600 hops/s resulting in exemplary time slots 201–212 being of about 625 μs in length. GFSK modulation results in a data rate of 1 Mb/s. The frequency carrier used for a typical Bluetooth system is the unlicensed ISM band at 2.4 GHz, with the bandwidth occupied by a single hop specified at 1 MHZ. The number of hops used in Europe and the US is 79, providing a spreading of about 80 MHZ in the 2.4 GHz ISM band.

Thus in accordance with the information above, channel 110 associated with piconet 100 may have a maximum instantaneous rate of 1 Mb/s. For systems using the 2.4 MHZ ISM band, regulatory bodies like the Federal Communications Commission (FCC) and European Telecommunications Standards Institute (ETSI) restrict the bandwidth of a single hop to 1 MHZ for system using an average transmit power larger than 0.75 mW. A problem arises however in that such bandwidth restrictions limit the maximum possible data rate achievable on channel 110. Given a bandwidth limitation of 1 MHZ, reliable data communications at rates higher than 2–3 Mb/s becomes unfeasible. For conventional operations on piconet 100, the data rate is accordingly limited to a maximum of around 1 Mbps.

Figure 4A:
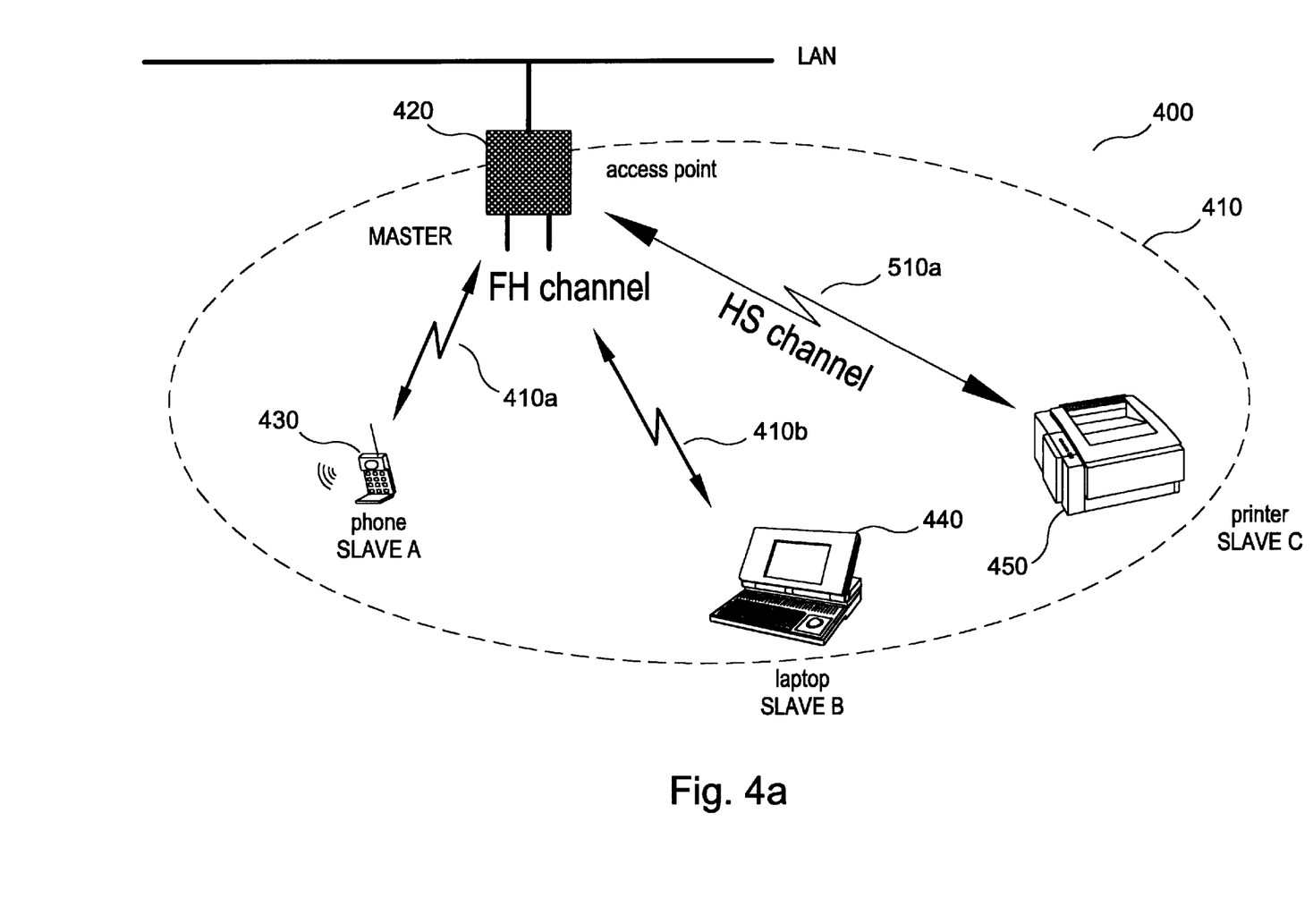
FIG. 4A is a diagram illustrating exemplary FH links and an exemplary high-speed link between a master and exemplary slave devices.

Many applications however require a higher data rate, and are often accompanied by a shorter range limitation. Such a scenario is illustrated in FIG. 4A. Piconet 400 may be established in, for example, an environment including LAN 400. LAN access point 420, which may be a LAN server, telephonic device, cellular or wireless communication base station, or the like, may act as a master and will be referred to hereinafter as master 420. Cordless phone 430, laptop 440, and printer 450 may act as exemplary slaves and may hereinafter be referred to respectively as slave A 430, slave B 440, and slave C 450. All devices may be synchronized to a FH link.

The operation of a FH link and HS link on a common channel according to the present invention may best be described by an example. At some point in time, for example, the laptop or slave B 440 may desire to download a print job to the printer or slave C 450. Since piconet 100 is configured as a star network, slave B 430 may normally only reach slave C 450 via the LAN access point or master 420. Since the FH link operates at the maximum practical limit of 1 Mb/s and is used in this example both for communication between master 420 and slave B 440 and between master 420 and slave C 450, the maximum effective data rate for the download operation is limited to 500 kb/s. Preferably, slave B 440 may temporarily leave piconet 100 controlled by master 420 and create its own piconet to slave C 450. In such a hypothetical case, slave B 440 would support a FH link to slave C 450 directly, resulting still in a maximum effective rate of only 1 Mb/s. An even higher data rate can be obtained in accordance with the present invention. Assuming slave C 450 is in close proximity, for example 3–10 m, to slave B 440, it would suffice to cover such a distance using 0 dBm transmit power. Accordingly, a link between slave B 440 and slave C 450 may be created with a much larger bandwidth than 1 MHZ. Data rate may be increased to 5–10 Mb/s using a high speed connection as will be described in greater detail hereinafter.

Figure 4B:
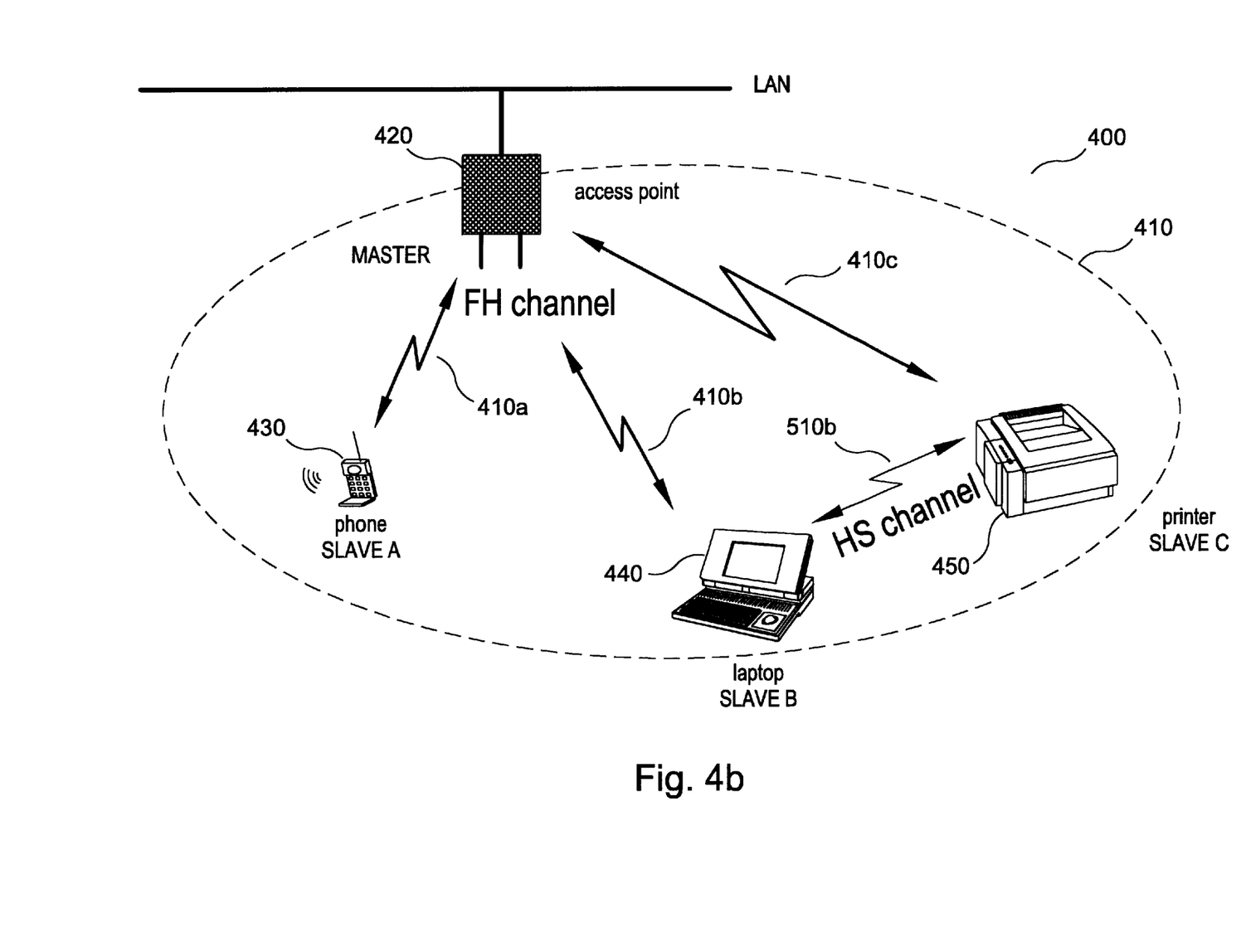
FIG. 4B is a diagram illustrating exemplary FH links between an exemplary master and exemplary slave devices and an exemplary high-speed link between exemplary slave devices.

When any two communication units participating in communications over piconet 400 desire to increase the speed of communications, they may request a high-speed (HS) link. It is important to note that a distinction may be made between an HS link, such as channel 510a between master 420 and slave C 450, as illustrated in FIG. 4A and an HS link, such as channel 510b between two or more slaves, such as slave B 440 and slave C 450 as illustrated in FIG. 4B. When a HS link, such as channel 510a is established between master 420 and slave C 450 in accordance with one exemplary embodiment of the present invention, master 420 time multiplexes between slave C 450 associated with channel 510a, the HS link, and the other slaves, such as slave A 430 and slave B 440 in piconet 400. Master 420 jumps between channel 510a and the FH link associated with, for example, channel 410a and 410b for slave A 430 and slave B 440 respectively. If the effective data rate on the HS link, channel 510a is important, master 420 should allocate many time slots as to slave C 450 for traffic and just enough time slots for traffic to slave A 430 and slave B 440 to enable FH synchronization to be maintained. Maximum data rate may be achieved on channel 510a by allocating all time slots to the HS link, however, FH synchronization will likely be lost.

Figure 5:
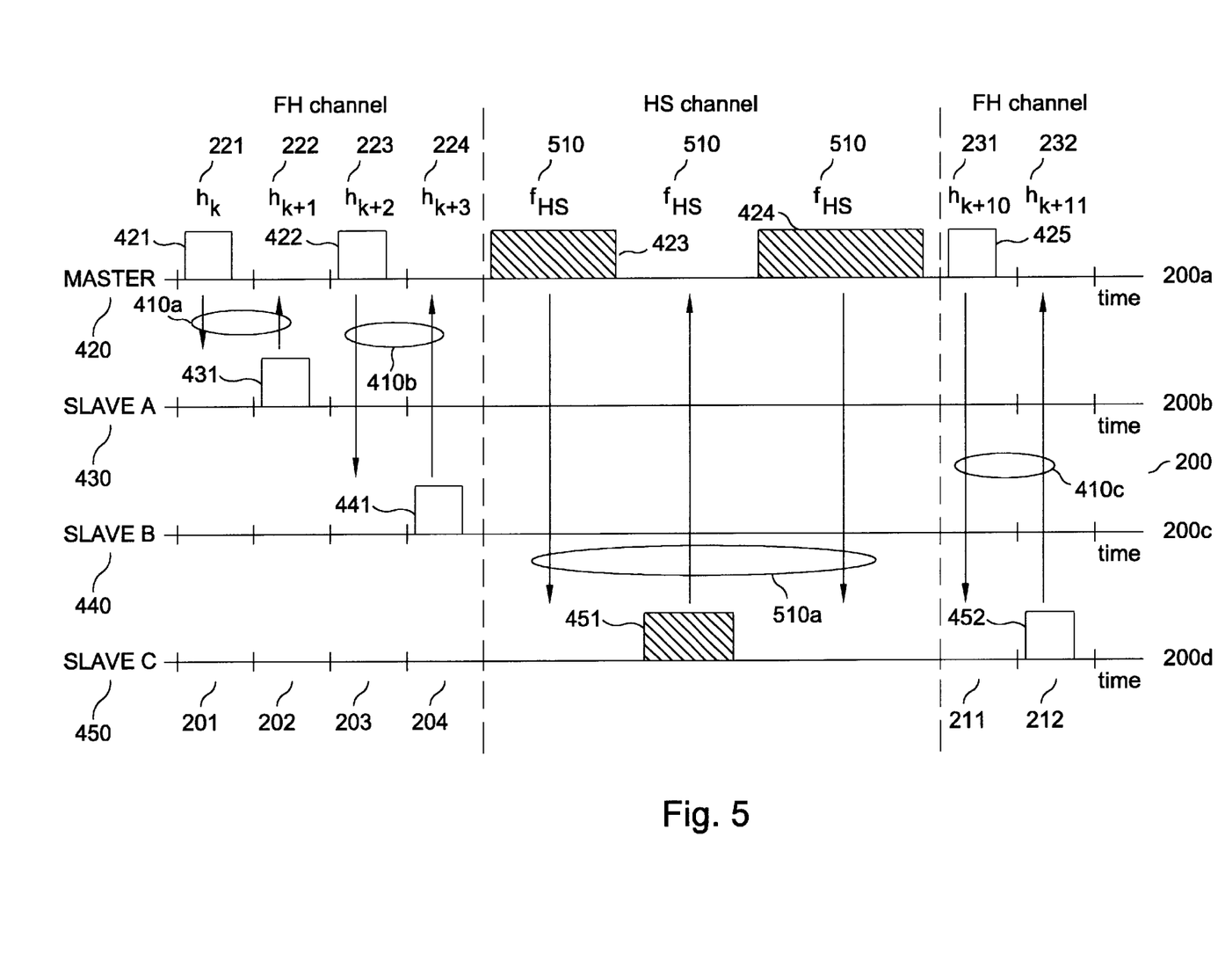
FIG. 5 is a diagram illustrating FH links between a master and slaves A, B and C and a high-speed link between a master and a slave device in accordance with an exemplary embodiment of the present invention.

FIG. 5 illustrates this concept in more detail, wherein master 420 supports three slaves: slave A 430, slave B 440, and slave C 450 over channels 410a, 410b, and 410c respectively. An HS link may be established, for example, between master 420 and slave C 450 over channel 510a. An HS link between master 420 and slave A 430 reflects the configuration illustrated in 4A. As can be seen from FIG. 5, master 420 may communicate packet 421 to slave A 430 over channel 410a on time slot 201 at frequency $h_K$ 221. Slave A 430 may respond in a manner as described above by responding with packet 431 in the next time slot 202 at frequency $h_{K+1}$ 222. Similarly, master 420 may communicate packet 422 to slave B 440 over channel 410b on time slot 203 at frequency $h_{K+2}$ 223. Slave B 440 may respond in a manner as described above by responding with packet 441 in the next time slot 204 at frequency $h_{K+3}$ 224. With regard to slave C 450, master 420 may, at point x, shift from FH communications on link 410c to HS communications on channel 510a and may shift back to FH communications, releasing channel 510a, at point y. It should be noted that, while FIG. 5 illustrates point x and y as occurring within frequency hopping periods represented by traversing, for example, frequencies $h_K$ 221 to $h_{K+11}$ 232, master 420 may maintain HS communications with, for example, slave C 450 through several frequency hopping iterations through the entire range of frequencies $h_K$ 221 to $h_{K+11}$ 232.

Accordingly, master 420 conducts HS communications with slave C 450 over channel 510a by communicating on frequency carrier $f_{HS}$ 510. Once the HS channel is established in a manner described in greater detail hereinafter, master 420 may send variable length packet 423 to slave C 450. Slave C 450 may send variable length packet 424. Master 420 may send additional variable length packet 424 which may or may not be responded to by slave C 450. It is important to note that the data rate for the HS link is adaptive in that, for example, by reducing the scope of communications between, for example, master 420 and slave A 430 and slave B 440, the data rate associated with the HS link may be increased. At point y, master 420, for example, may resume FH communications with slave C 450 over channel 410c by, for example, transmitting packet 425 on time slot 211 at frequency $h_{K+10}$ 231. In response, slave C 450 may send packet 452 in the next time slot 212 at frequency $h_{K+11}$ 232.

If on the other hand, for example, slave B 440 and slave C 450 desire to establish an HS link as is illustrated in FIG. 4B, the situation is quite different. In an alternate embodiment of the present invention, master 420 may establish an FH link with slave A 430, slave B 440, and slave C 450. At some point, denoted as point x in FIG. 6, slave B 410 and slave C 450 may establish HS communications on a separate link, such as channel 510b. Accordingly, communications over the FH link and HS link may proceed in parallel provided that different frequencies are used for the FH and HS links. Collisions may occur if frequencies for channel 510b conflict with FH frequencies associated with link 410 at the same point in time. Master 420 may communicate over channel 410a, for example, packet 421 to slave A 430 over time slot 201 at frequency $h_K$ 221. Slave A 430 may respond in a manner as described above by responding with packet 431 in the next time slot 202 at frequency $h_{K+1}$ 222. Similarly, master 420 may communicate packet 422 to slave B 440 over channel 410b on time slot 203 at frequency $h_{K+2}$ 223. Slave B 440 may respond in a manner as described above by responding with packet 441 in the next time slot 204 at frequency $h_{K+3}$ 224. Master 420 may further send packets 427, 428, and 429 over channel 410a to slave A 430 on time slots 205, 207, and 209 respectively using respective frequencies $h_{K+4}$ 225, $h_{k+6}$ 227, and $h_{k+8}$ 229. In response, slave A 430 may send respective packets 432, 433, and 434 over channel 410a in respective time slots 206, 208, and 210 which correspond respectively to the next slots after packets 427, 428, and 429 are sent. Packets 432, 433, and 434 may further be sent over frequencies $h_{k+5}$ 226, $h_{k+7}$ 228, and $h_{k+9}$ 230, respectively.

Figure 6:
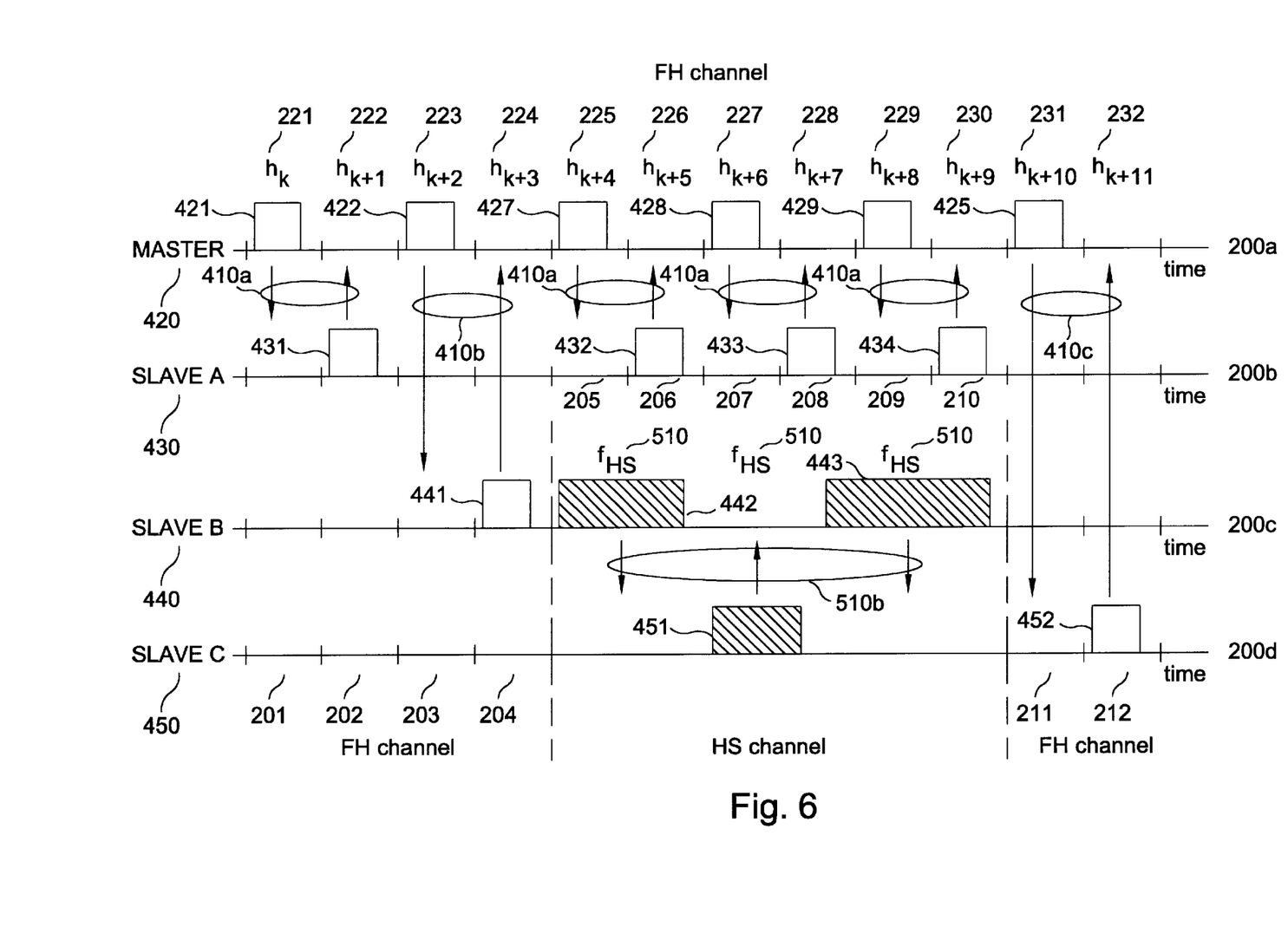
FIG. 6 is a diagram illustrating a high-speed link between slaves B and C in accordance with another exemplary embodiment of the present invention.

Meanwhile, HS communications may proceed between slave B 440 and slave C 450. Packet 442, for example may be sent on channel 510b from slave B 440 to slave C 450 on the frequency carrier allocated for the HS link, referred to as $f_{HS}$ 510. Packet 451 may further be sent from slave C 450 to slave B 440. It is important to note that channel 510b is established on HS frequency carrier $f_{HS}$ 510. Details of the establishment of the HS link and associated frequency carrier $f_{HS}$ 510, are described in greater detail hereinafter. In accordance with an exemplary embodiment of the present invention, master 420 may continue FH communications with slave C 450 on channel 410c by sending, for example, packet 425 over time slot 211 at frequency $h_{k+10}$ 231 to slave C 450. Slave C 450 may respond over channel 410c with packet 452 in the next time slot 212 at frequency $h_{K+11}$ 232.

Figure 7:
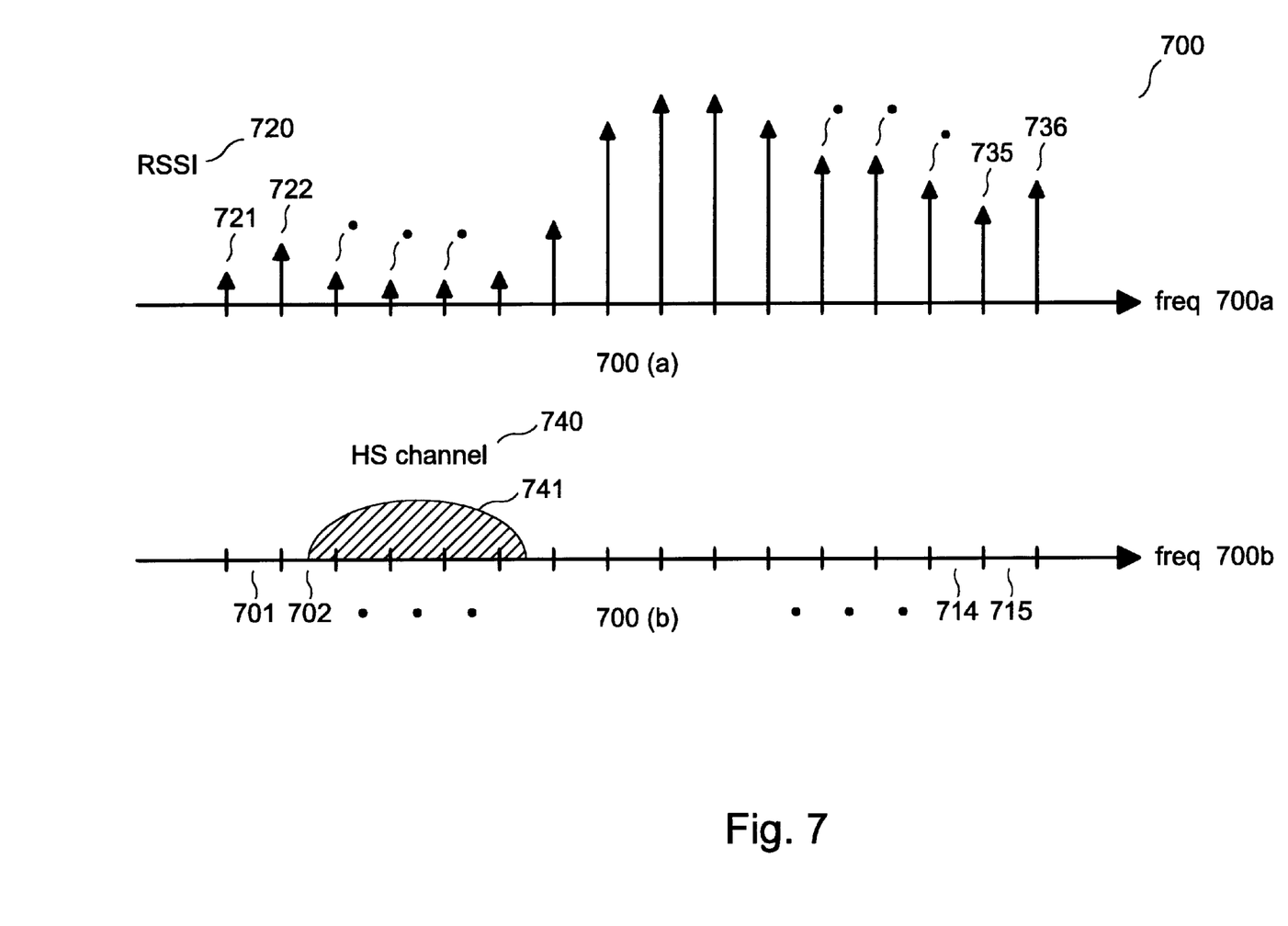
FIG. 7 is a diagram illustrating exemplary RSSI measurement results and the exemplary selection of an HS link.

It is important to note that once established, the HS link may be stationary and therefore does not frequency hop. Instead, a dynamic frequency channel selection scheme may be used. Before the HS link is established, signal strength measurements may be carried out by master 420 and/or any one or more of slave A 430, slave B 440, or slave C 450 in the radio spectrum available for the HS link as illustrated in FIG. 7. HS radio spectrum 700 is not necessarily the same as the radio spectrum used for the FH link of piconet 100 (e.g. the 80 MHZ of the 2.4 GHz ISM band). In HS radio spectrum 700, HS band 741 may be selected on which the lowest interference is measured. For example, frequency plot 700a represents RSSI 720 measurements 721 through 736 over HS radio spectrum 700. The width of HS band 741 corresponds to the bandwidth required to support HS link 740. As is illustrated, HS link 740 is selected to coincide with the RSSI 720 measurements 723 through 726 since they correspond to low RSSI 720 values. As the RSSI 720 measurements change over time the allocation of HS band 741 may change as will be described in greater detail hereinafter.

Figure 8:
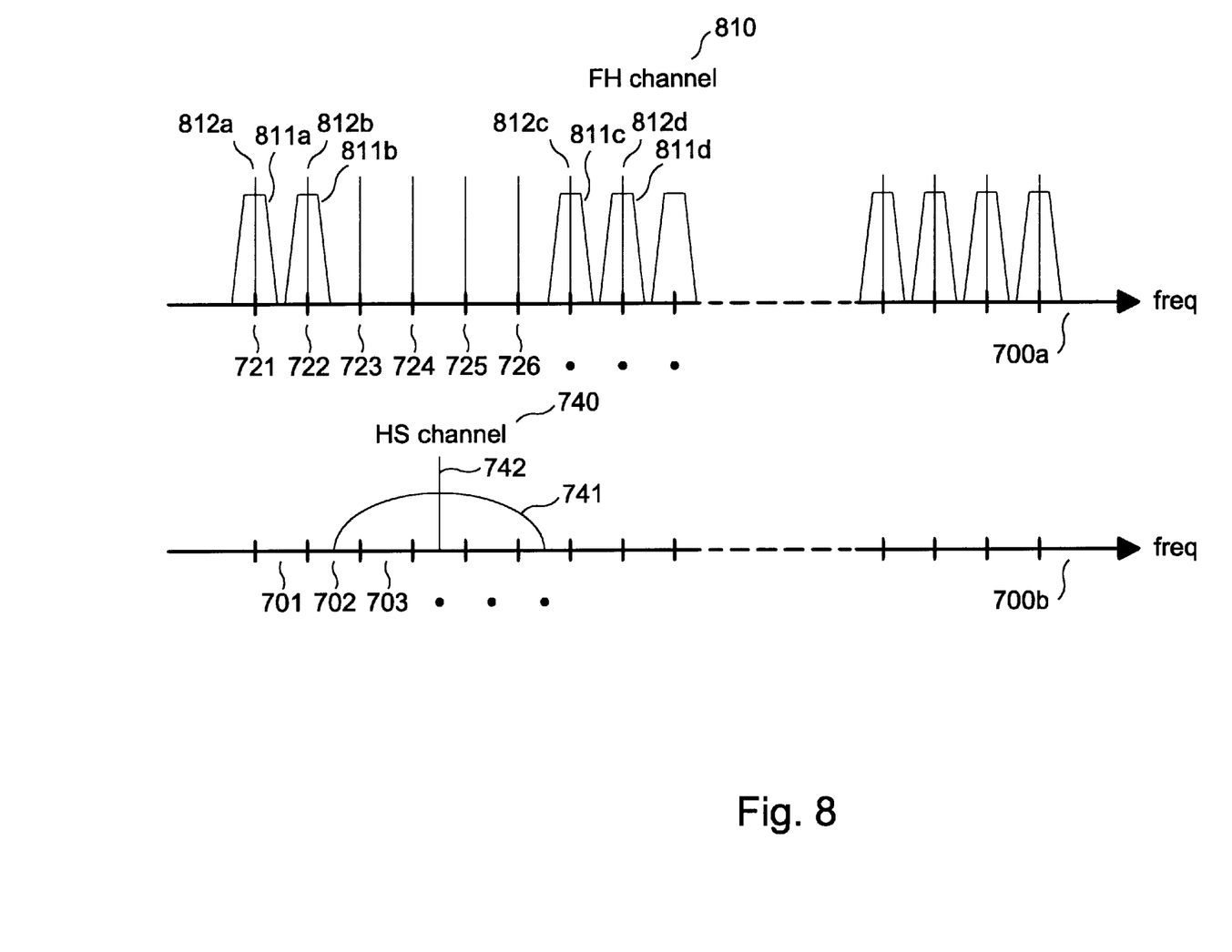
FIG. 8 is a diagram illustrating frequency interaction between a FH link and a HS link in accordance with an exemplary embodiment of the present invention.
Figure 9:
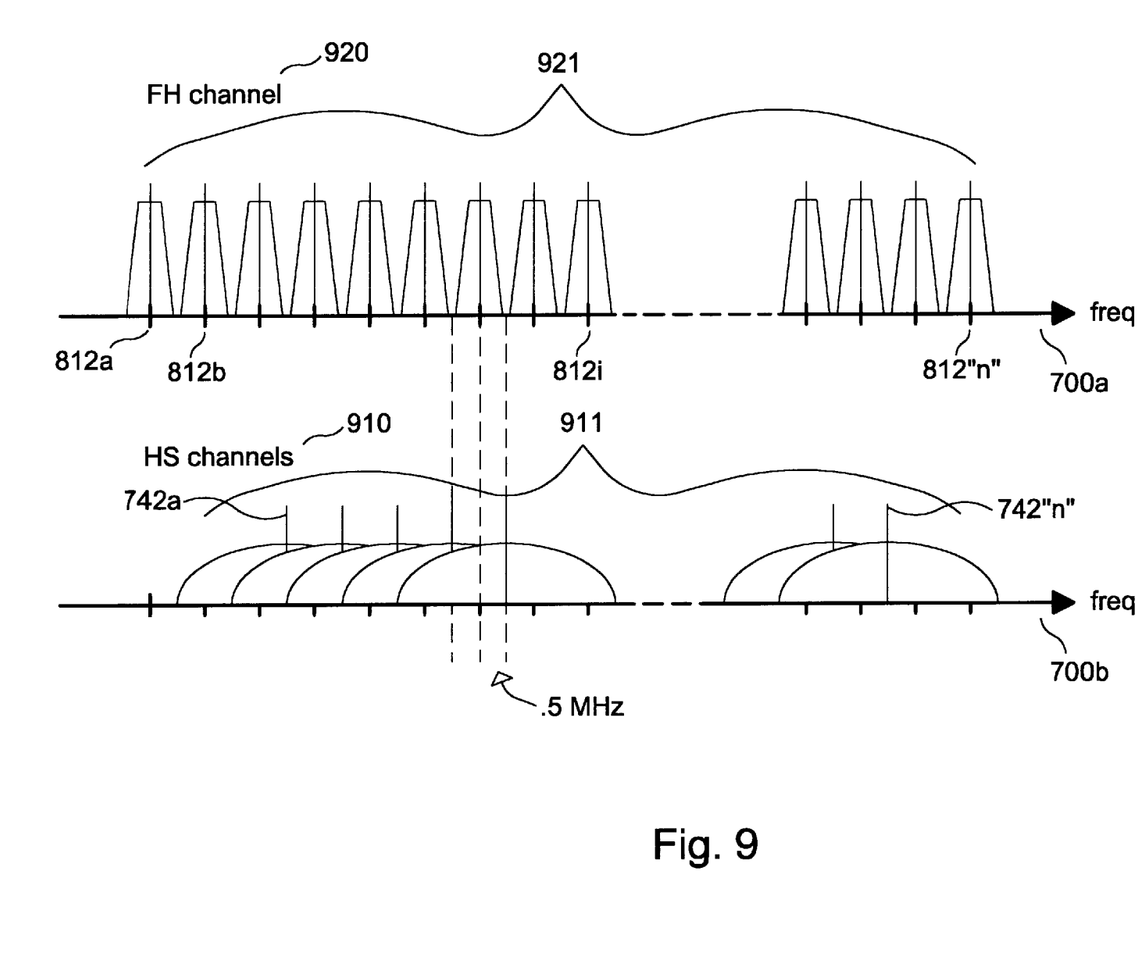
FIG. 9 is a diagram illustrating carrier allocations on a FH link and a HS link using the same radio band in accordance with an exemplary embodiment of the present invention.

If HS radio spectrum 700 coincides with the FH radio spectrum in the 2.4 GHz ISM band, the width of HS band 741 is preferably smaller than 4 MHZ for the following reasons. For the operation of a FH system with a transmit power larger than 0.75 mW, the FCC requires the number of hop channels to be at least 75. In the Bluetooth standard, 79 hop channels are defined. If 4 consecutive hops can be used for HS link 740, 75 hops are remaining to fully support the FH link of piconet 100 as is illustrated in FIG. 8. In such an exemplary embodiment, HS link 740 may be established at four 1 MHz hop intervals wide, such as hop intervals 723, 724, 725, and 726 of frequency plot 700a, and, accordingly, the FH link 810 at the required 75 hops may co-exist within the same 80 MHZ band of the 2.4 GHz ISM band without interfering with each other. As is shown, hops may be centered at hop carriers 812a–812d and may be surrounded by 1 MHz envelopes 811a–811d with negligible guard bands separating each hop. Interference may only occur when HS link 740 is present between, for example slave B 440 and slave C 450, as illustrated in FIG. 4B and in FIG. 6. In contrast, the exemplary embodiment shown in FIG. 4A and FIG. 5, where an HS link is established between master 420 and, for example, slave C 450, only one unit can transmit at a time and no collisions take place irrespective of frequency allocation between HS and FH links. Frequency carrier allocation 921 for hop carriers 812a–812"n" of the FH link and the semi-stationary carrier allocation 911 for carriers 742a–742"n" of the HS link may both use a 1 MHZ spacing but may be staggered by 0.5 MHZ as is shown in FIG. 9. As a result, HS link 740 for example, can exactly replace 4 hops of the FH link.

Figure 10:
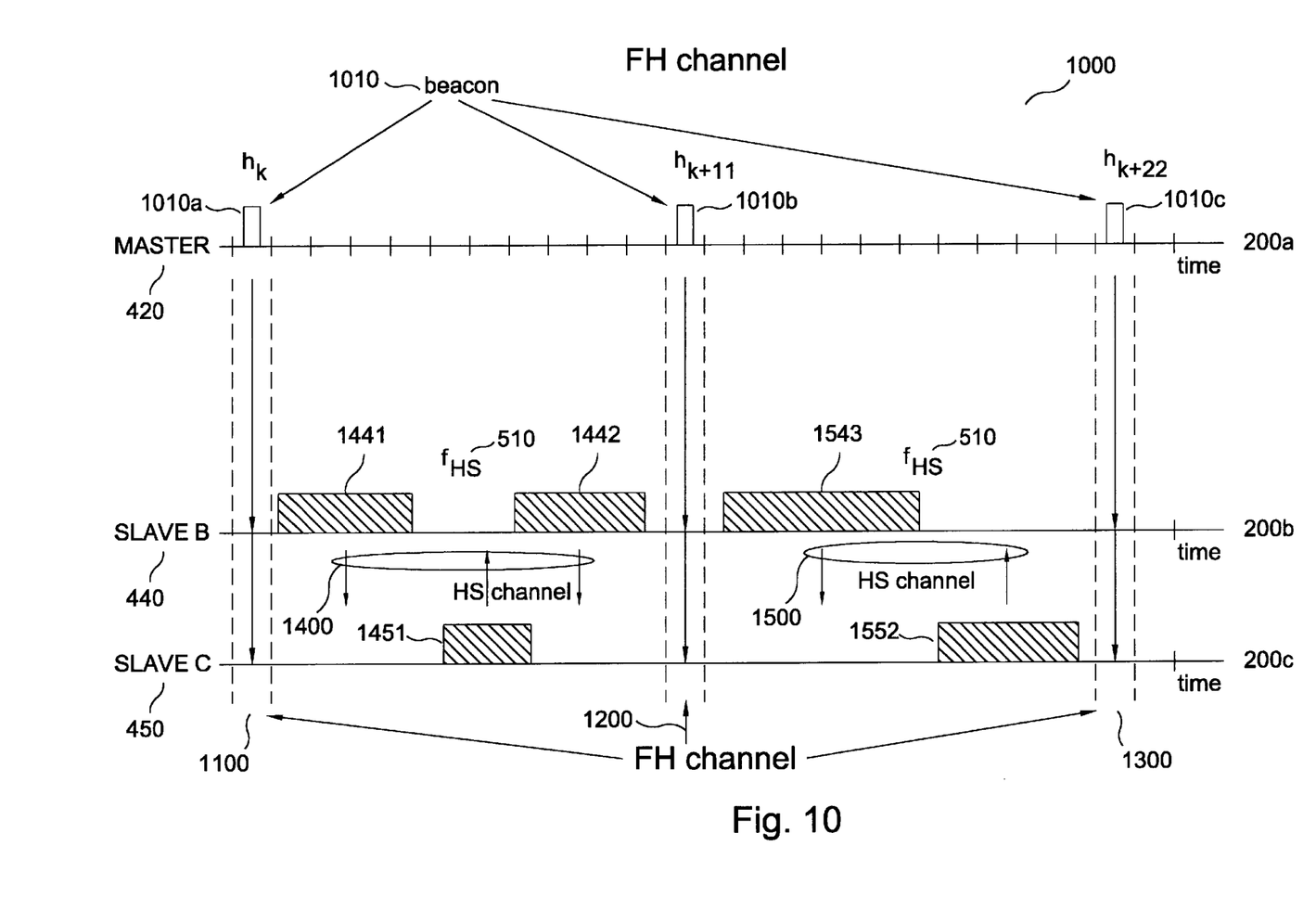
FIG. 10 is a diagram illustrating beacon tracking of slaves B and C according to a further exemplary embodiment of the present invention.

As previously described, selection of a particular band for HS link 741 is adaptive. If the performance of HS link 741 deteriorates, units operating on HS link 741 may return to the FH link and new RSSI 720 measurements may be carried out to determine a better band in HS radio spectrum. In an alternate embodiment of the present invention, slave B 440 and slave C 450, for example, may temporarily leave piconet 100 to establish an HS link over, for example, HS channel 410d, again, as is illustrated in FIG. 4B and FIG. 6. To facilitate return to the FH link should HS link 741 deteriorate, master 420 maintains control of slave B 440 and slave C 450 in one of, for example, two ways. Slave B 440 and slave C 450 and master 420, for example, may agree on a fixed interval for which HS link 741 will last. When the predetermined interval expires, slave B 440 and slave C 450 will automatically return to piconet 100, at, for example, point y as is illustrated in FIG. 6. If desired, slave B 440 and slave C 450 may request HS link 741 for an additional interval. In a different embodiment, slave B 440 and slave C 450 may track communications on the FH link with a relatively low duty cycle. Master 420 may additionally support, for example, a beacon signal 1010 on FH channel 1200 as is illustrated in FIG. 10 and further described in U.S. patent application Ser. No. 09/210,594, incorporated herein above. Master 420 may transmit beacon packets 1010*a*, 1010*b*, and 1010*c* at fixed intervals. Beacon packets 1010*a*, 1010*b*, and 1010*c* may be used respectively for slave A 430, slave B 440, and slave C 450 when one or more of slave A 430, slave B 440, and slave C 450 want to enter a low-power mode (e.g. PARK mode) where they may remain synchronized to FH channel 1200 of piconet 100 but do not exchange any packets. Slave A 430, slave B 440, or slave C 450 which are inactivated in the low-power mode may be re-activated and returned to piconet 100 as further described in U.S. patent application Ser. No. 09/210,594 incorporated herein above. Accordingly, slave B 440 and slave C 450 communicating on, for example, HS channel 1400 may also remain synchronized with FH channel 1200.

At periodic intervals, slave B 440 and slave C 450 may be configured to "listen" for beacon packets 1010*a*, 1010*b*, and 1010*c*. If present, beacon packets 1010*a*, 1010*b*, and 1010*c*, may, for example, include a message ordering slave B 440 and slave C 450 to release HS channel 1400 and return to FH channel 1200 until further instructed and, in so doing, may interrupt communications on HS channel 1400. During intervals in which slave B 440 and slave C 450 are listening for beacon packets 1010*a*, 1010*b*, and 1010*c*, slave B 440 and slave C 450 may further interrupt communicating with each other over HS channel 1400. As illustrated, slave B 440 may send, for example, packets 1441, 1442, and 1543 to slave C 450 at frequency $f_{HS}$ 510. When slave B 440 and slave C 450 desire to return to piconet 100 and FH channel 1200, they may do so via an access procedure supported by the beacon protocol.

It is important to note that the data link protocol on HS link 1500, as suggested earlier, may differ from the data link protocol on FH link 1200. Depending on the radio spectrum used for HS link 1400, for example, if the radio spectrum associated with HS link 1400 is in the 5 GHz range, a listen before-talk protocol may be applied to conform to the etiquette or protocols associated with communications in the 5 GHz band. In other bands, other etiquette rules may apply and may be adopted on HS link 1400 to regulate the flow of, for example, data packets 1543 and 1552.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method for communication using a plurality of time slots within a frequency spectrum, the method comprising the steps of:

establishing a frequency hopping traffic channel between a first and a second communication unit, the frequency hopping traffic channel having a set of the plurality of time slots and a set of hop carrier frequencies associated therewith;

establishing a stationary traffic channel between the first and the second communication unit, the stationary communication traffic channel having a location within the frequency spectrum associated therewith;

establishing the frequency hopping traffic channel between the first, the second, and a third communication unit; and establishing the stationary traffic channel between the second and the third communication unit;

wherein the frequency hopping traffic channel avoids the location of the stationary traffic channel.

2. The method of claim 1, wherein the first communication unit is a master communication unit and the second and third communication units are slave communication units, and wherein the method further comprises the step of periodically transmitting a beacon packet from the master to one or more of the slave communication units over the frequency hopping traffic channel, the beacon packet indicating for the one or more of the slave communication units to release the stationary traffic channel and return to the frequency hopping traffic channel.

3. An apparatus for communication using a plurality of time slots within a frequency spectrum, the apparatus comprising:

a first communication unit coupled to a second communication unit; wherein the first communication unit is configured to:

establish a frequency hopping traffic channel between the first and the second communication unit, the frequency hopping traffic channel having a set of the plurality of time slots associated therewith; and establish a stationary traffic channel between the first and the second communication unit, the stationary communication traffic channel having a location within the frequency spectrum associated therewith, wherein the first communication unit is further configured to:

establish the frequency hopping traffic channel between the first, the second, and a third communication unit; and establish the stationary traffic channel between the second and the third communication unit;

and wherein the frequency hopping traffic channel avoids the location of the stationary traffic channel.

4. The apparatus of claim 3, wherein the first communication unit is a master communication unit and the second and third communication units are slave communication units, and wherein the first communication unit is further configured to transmit a beacon packet from the master to one or more of the slave communication units over the frequency hopping traffic channel, the beacon packet indicating for the one or more of the slave communication units to release the stationary traffic channel and return to the frequency hopping traffic channel.

* * * * *